Feb. 12, 1952 E. J. BEAULIEU ET AL 2,585,080
WIRE STRIPPING PLIERS
Filed May 27, 1948
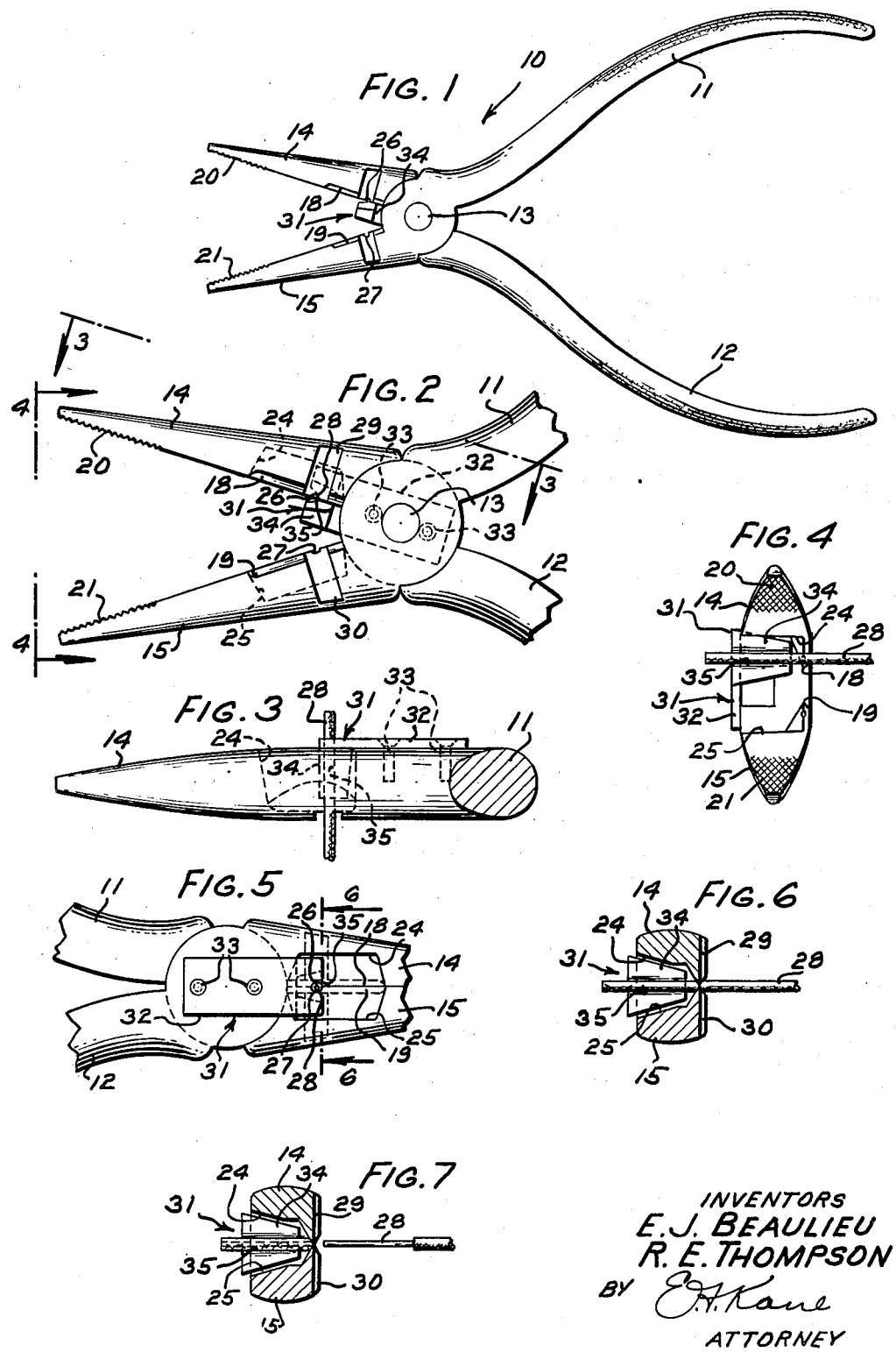
INVENTORS
E. J. BEAULIEU
R. E. THOMPSON
BY E. H. Kane
ATTORNEY Patented Feb. 12, 1952

2,585,080

UNITED STATES PATENT OFFICE 2,585,080

WIRE STRIPPING PLIERS

Ezra J. Beaulieu and Robert E. Thompson, Downers Grove, Ill., assignors to Western Electric Company, Incorporated, New York, N. Y., a corporation of New York Application May 27, 1948, Serial No. 29,438

2 Claims. (Cl. 81—9.5)

This invention relates to wire stripping pliers and more particularly to combination pliers for cutting wire and severing and stripping insulation from an insulated wire.

An object of this invention is to provide a simple and efficient wire stripping and cutting pliers.

In accordance with the general features of this invention, there is provided, in one embodiment thereof as applied to a wire handling and cutting pliers of a usual known construction, a wire guide member secured to one of the pivoted jaws which are each recessed in a usual manner at one side, the wire guide member extending transversely of the jaws and into the cooperating recesses but spaced from the walls thereof. The guide member is formed with a slot for receiving and guiding into operative position the end of an insulated wire which is to be stripped of insulation, the bottom of the slot being axially aligned with cooperating half-round cutting edges provided in each of the jaws to provide an annular cutting edge when the jaws are closed for circumferentially severing the insulation on the wire without engaging or marring the wire itself. Each jaw is provided wtih the usual cutting edge at one side which cooperate to cut the wire, such wire cutting edges being in alignment with the half round insulation severing edges.

Other objects and advantages of this invention will more fully appear from the following detailed description, taken in conjunction with the accompanying drawing, in which Fig. 1 is a side view of the pliers embodying the features of the invention, the jaws being shown in their open positions;

Fig. 2 is a fragmentary enlarged side view of a portion of Fig. 1 with a wire in position in the guide member;

Fig. 3 is a plan view, partly in section, taken on the line 3—3 of Fig. 2;

Fig. 4 is an end view taken on the line 4—4 of Fig. 2;

Fig. 5 is a fragmentary side view looking at the opposite side of the pliers from that shown in Fig. 2, the jaws being shown in their closed positions with the insulation on the wire circumferentially severed;

Fig. 6 is a vertical sectional view taken on the line 6—6 of Fig. 5; and

Fig. 7 is a view similar to Fig. 6 showing the wire after being longitudinally withdrawn from the pliers with the severed insulation stripped therefrom.

As shown in the drawing, referring particularly to Fig. 1, the numeral 10 represents, in general, pliers of a conventional and known construction comprising the usual handles 11 and 12, which are pivoted at 13 and provided with upper and lower opposed jaws 14 and 15 of the long-nosed type and having opposed straight cutting edges 18 and 19, respectively, at one side (Figs. 2 and 4), intermediate their ends. To the left of the cutting edges 18 and 19, as viewed in Figs. 1 and 2, the jaw ends 14 and 15 have their opposed cooperating surfaces scored at 20 and 21, respectively, for gripping purposes. The sides of the jaws 14 and 15 opposite the cutting edges 18 and 19 are formed with opposed recesses 24 and 25, respectively, of the usual type (Figs. 5 and 6), which extend transversely and longitudinally of the jaws for the length of the cutting edges. Formed in each of the jaws 14 and 15 along the cutting edges 18 and 19 are half-round cutting edges 26 and 27, respectively, which, when the jaws are closed, as shown in Figs. 5 and 6, form a cutting hole of a diameter slightly greater than the diameter of a wire 28 (Figs. 6 and 7) from which the surrounding insulation is to be circumferentially severed by the cooperating half-round cutting edges 26 and 27. The diameter of the cutting hole provided by the cutting edges 26 and 27 will be dependent on the size of the wire to be stripped of insulation and should be such that the cutting edges will not engage the wire and thus no marring of the wire occurs. In the closed positions of the jaws 14 and 15, the engagement of the scored surfaces 20 and 21 serve to limit the movement of the jaws beyond points which are necessary for the half-round cutting edges 26 and 27 to circumferentially sever the insulation on the wire 28 but will permit the straight cutting edges 18 and 19 to cut the wire. In order to form sharp half-round cutting edges 26 and 27 along the cutting edges 18 and 19, respectively, flat faced slots 29 and 30 (Figs. 2 and 6) are milled in the sides of the jaws 14 and 15 to a depth coinciding with the planes of the cutting edges 18 and 19.

The jaw 14 carries a guide member 31 for the purpose of accurately positioning and guiding the end of an insulated wire 28 into accurate position between the half-round cutting edges 26 and 27 of the open jaws 14 and 15, whereby, when the wire is inserted from the forward sides of the jaws, as shown in Figs. 1 and 2, it may be stripped of insulation at its end. The guide member 31 comprises, in the present embodiment, an L-shaped member (Fig. 3) having its longer arm 32 secured by screws or rivets 33 to the outer face of the jaw 14 and its shorter arm 34 extending transversely into the space formed by the recesses 24 and 25 of the jaws 14 and 15, but spaced from the walls of the recesses at all times. Formed in the left hand end face of the guide member arm 34, as viewed in Figs. 2 and 3, is a slot 35, which extends throughout the length of the arm, and is parallel to the cutting hole formed by the half-round cutting edges 26 and 27 formed in the jaws 14 and 15 when the jaws are closed (Figs. 5, 6 and 7). At its bottom, the slot 35 is provided with a substantially half-round formation of a dimension suitable to freely receive the wire 28 including its insulating covering. The axis of the half-round bottom formation of the slot 35 is fixedly aligned with the axis of the half-round cutting edge 26 of the jaw 14, so that when the jaws 14 and 15 are closed, the axis of the cutting hole provided by the half-round cutting edges 26 and 27 will be in accurate axial alignment with the half-round bottom formation of the slot 35 in the guide member 31. Although in the present embodiment of the invention the guide member 31 is shown and described as a separate element fixed to the jaw 14 by the screws 33, it will be understood that it could be formed integral with either the jaw 14 or 15.

The combination pliers 10, described in detail above, provided with half-round cutting edges 26 and 27, coacting to form a cutting hole dimensioned solely for the particular diameter of the metal wire 28 which is to be stripped of insulation at its end and also with a guide member 31 having the bottom of its slot 35 dimensioned to freely receive the wire 28 including its insulating covering, may be used as follows: First, the wire 28 to be used may be cut to length by means of the straight cutting edges 18 and 19 in a usual manner. Secondly, the end of the wire 28 for a suitable length from either one end or both ends may be stripped, one end at a time, of its insulating cover by opening the jaws 14 and 15 and inserting the end of the cut piece of wire 28 between the jaws from the forward side thereof, as viewed in Fig. 2, at the same time positioning the wire in the bottom of the slot 35 of the guide member 31, which is fixedly aligned with the half-round cutting edge 26 of the jaw 14. After the wire 28 has thus been positioned with its end to be stripped of its insulating cover extending the desired length from the half-round cutting edge 26 of the upper jaw 14 and across the half-round bottom formation of the guide member slot 35 (Figs. 3, 4 and 6), the jaws 14 and 15 may be closed to the position shown in Figs. 5 and 6. In closing, the jaws 14 and 15 will sever the insulating covering by the action of the coacting half-round cutting edges 26 and 27 of the jaws 14 and 15 without contacting the metal of the wire. With the jaws 14 and 15 still held closed, the insulation covering on the wire to the left of the cutting hole may be stripped from the wire by pulling the wire 28 in the direction of the arrow (Fig. 6). Thirdly, the stripped wire 28 may be gripped by the opposed scored surfaces 20 and 21 of the long-nosed ends of the jaws 14 and 15 and associated with the apparatus to which it is to be attached and, upon being attached, any excess skinned wire may be trimmed off by means of the straight cutting edges 18 and 19.

It is to be understood that the above-described arrangements are simply illustrative of the application of the principles of the invention. Numerous other arrangements may be readily devised by those skilled in the art which will embody the principles of the invention and fall within the spirit and scope thereof.

What is claimed is:

1. A tool for circumferentially severing and stripping insulation from the end of a wire comprising a pair of pivoted jaws formed and cooperating when closed to provide a recess open at one side of the jaws, each of the jaws having a half-round cutting edge formed in the opposite sides of the jaws in opposed faces thereof cooperating to form an annular cutting hole communicating with said recess when said jaws are closed and of a diameter to freely receive a wire but to circumferentially sever the insulation thereon and providing an abutment for the severed insulation when stripped from the wire, and a wire guide member carried by one of said jaws, said member having a slotted portion extending into said recess and spaced from the walls thereof for supporting and guiding the wire into operative position as said jaws are closed, an inner half-round formation of said slot being coaxial with said cutting hole.

2. A tool for circumferentially severing and stripping insulation from the end of a wire comprising a pair of pivoted jaws formed and cooperating when closed to provide a recess open at one side of the jaws, each of the jaws having a half-round cutting edge formed in the opposite sides of the jaws in opposed faces thereof cooperating to form an annular cutting hole communicating with said recess when said jaws are closed and of a diameter to freely receive a wire but to circumferentially sever the insulation thereon and providing an abutment for the severed insulation when stripped from the wire, and a wire guide member extending from one of said jaws into said recess and spaced from the walls thereof, said member having a slot in its free end face extending transversely of said recess for supporting and guiding the wire into operative position with respect to said cutting hole as said jaws are closed.

EZRA J. BEAULIEU.
ROBERT E. THOMPSON.

REFERENCES CITED

The following references are of record in the file of this patent:

UNITED STATES PATENTS

| Number | Name | Date |
| --- | --- | --- |
| 669,556 | Spring | Mar. 12, 1901 |
| 1,338,398 | Adams | Aug. 23, 1921 |
| 1,939,574 | Saylor | Dec. 12, 1933 |
| 2,386,328 | Rollings | Oct. 9, 1945 |
| 2,407,233 | Greer et al. | Sept. 10, 1946 |